United States Patent [19]

Wingen

[11] 4,275,631
[45] Jun. 30, 1981

[54] SLITTING APPARATUS

[75] Inventor: Peter Wingen, Overath, Fed. Rep. of Germany

[73] Assignee: Dienes Werke fuer Maschinenteile GmbH & Co. KG, Overath, Fed. Rep. of Germany

[21] Appl. No.: 87,697

[22] Filed: Oct. 23, 1979

[30] Foreign Application Priority Data

Oct. 27, 1978 [DE] Fed. Rep. of Germany ....... 2846747

[51] Int. Cl.³ .............................................. B26D 1/24
[52] U.S. Cl. ....................................... 83/501; 83/504; 83/582; 83/664; 83/675; 83/698
[58] Field of Search ................. 83/500, 501, 502, 675, 83/698, 664, 425.3, 582, 504

[56] References Cited

U.S. PATENT DOCUMENTS

| 620,944 | 3/1899 | Mather | 83/501 |
| 3,173,326 | 3/1965 | Gulliksen et al. | 83/501 |
| 3,286,574 | 11/1966 | Durand | 83/501 |
| 3,762,254 | 10/1973 | Tsymbal et al. | 83/664 X |
| 3,828,633 | 8/1974 | Klingen | 83/500 X |
| 3,951,024 | 4/1976 | Weiskopf | 83/501 X |

FOREIGN PATENT DOCUMENTS 149499 8/1920 United Kingdom ...................... 83/501

Primary Examiner—Frank T. Yost
Attorney, Agent, or Firm—Edward E. Sachs

[57] ABSTRACT

Apparatus for slitting sheet material includes a pair of rotatable shafts having cooperating cutting knife assemblies thereon. The knives on one shaft are in the form of axially-spaced knife rings receivable between knife members on the other shaft. The knife rings are elastically deformable axially of the shafts and are spaced-apart a distance slightly greater than the spacing between the knife members to insure the absence of any gaps between the cooperating cutting knives. The knife members are releasably clamped axially on their shaft and are biased apart upon release of the axial clamping force in order to allow positioning of the knife rings between the knife members. Central mounting holes in the knife members increase in size from the axial center thereof toward the opposite ends thereof for allowing limited tilting movement of the knife members relative to the shaft on which they are mounted.

12 Claims, 3 Drawing Figures

SLITTING APPARATUS

BACKGROUND OF THE INVENTION

This application relates to the art of slitters and, more particularly, to slitters for slitting continuous sheet material into ribbons of precise width.

Slitting apparatus of a known type includes spaced and parallel rotatable shafts having cooperating cutting knives thereon. Sheet material is fed between the cooperating cutting knives which slit the sheet material into relatively narrow ribbons.

For certain applications, precision slitting of a sheet into ribbons is necessary due to the end use of the ribbons. For example, sheets of soft metal or the like are cut into ribbons for use as magnetic recording and playing tape. The magnetic tape is guided at its opposite edges through a playing and recording head, and the opposite longitudinal edges of the tape must not deviate from being parallel by more than hundredths of a millimeter.

In known slitters of the type described, the cooperating knife on the rotatable shafts are clamped axially. The end surfaces of the knives members and bushings cannot be machined perfectly flat, and some irregularities normally result. Axial clamping forces are also uneven for many reasons, and the central mounting hole in a knife member or bushing cannot be made perfectly perpendicular to its end surfaces. Even though defects of the type described may be only thousandths of a millimeter, they accumulate and combine with errors in final clamping or adjustment to cause defects in ribbons slit from sheet material by the knives.

In previous apparatus of the type described, sufficient axial clearance or movement has been provided between the cutting knives on the two shafts for accommodating the sum of all the irregularities and adjustment errors. As a result, the cutting gaps between the knives vary in size and axial position during each rotation of the knife shafts, and a wavy cut often results. In addition, when the cutting gap reaches its maximum in each revolution of the knives, the relatively soft material being cut is bent into the cutting gap and this results in a burr on the ribbon. Wavy cuts and burrs cause the opposite longitudinal edges of the ribbon to deviate out of parallel beyond permissible tolerances, and a burr also interferes with guidance of the ribbon through a head.

It is known to urge a cutting knife on one shaft elastically against a rigid knife on the other shaft for eliminating any cutting gap. However, previous arrangements for accomplishing this result in damaged ribbons of material intermediate acceptable ribbons. The damaged ribbons cannot be used and this waste of material cannot be accepted.

SUMMARY OF THE INVENTION

Slitting apparatus for precision slitting a plurality of ribbons from sheet material includes a pair of spaced parallel rotatable shafts having cooperating knife means thereon. The knife means on one shaft includes a hub mounted thereon for rotation therewith and for axial movement relative thereto. A pair of flat circular knife rings are mounted on the hub in axially-spaced relationship to one another. The knife means on the other shaft includes a pair of knife members of circular shape axially-spaced from one another, and having opposed flat facing surfaces spaced-apart for close reception of the knife rings therebetween. The knife rings are elastically yieldable axially of the shafts and are preferably spaced-apart a distance slightly greater than the spacing between the facing surfaces on the knife members.

The knife members on the other shaft are releasably clamped axially and are biased away from one another upon release of the axial clamping force to allow positioning of the knife rings between the knife members.

A collar is positioned on the hub between the knife rings and has opposite flat collar spacer surfaces against which the knife rings are held. The spacer surfaces extend outwardly from the hub a distance substantially less than the knife rings. Split snap rings are received in circumferential grooves in the outer surface of the hub for holding the knife rings on the hub and against the collar spacer surfaces. The collar has an outer collar surface spaced radially outwardly from the hub substantially the same distance as the cutting edges of the knife rings. Collar secondary surfaces extend substantially radially inwardly from the collar outer surface and are spaced inwardly from the knife rings.

A spacer ring is positioned between the knife members on the other shaft and has an outer diameter sustantially less than the outer diameter of the knife members. Springs are interposed between the spacer ring and the knife members for moving the knife members axially away from one another upon release of the axial clamping force on the knife members.

The knife members and spacer ring have central mounting holes for receiving a rotatable shaft. Each mounting hole increases in size from the axial center thereof toward the opposite ends thereof for allowing limited tilting movement of the spacer ring and knife members relative to the shaft to accommodate irregularities in the flat end surfaces of the knife members and spacer ring.

It is the primary object of the present invention to provide an improved slitting apparatus for slitting sheet material into ribbons having opposite longitudinal edges which are free of burrs and are parallel to one another within acceptable tolerances.

It is also an object of the invention to provide such a slitting apparatus which is very economical to manufacture and assemble, and which is relatively simple to adjust.

DESCRIPTION OF A PREFERRED EMBODIMENT

Figure 1:
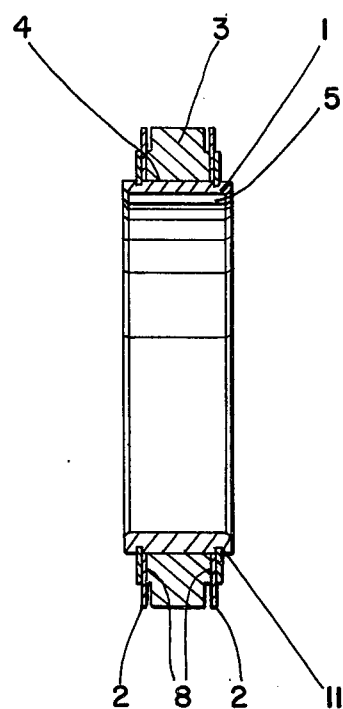
FIG. 1 is a cross-sectional elevational view of an improved knife assembly used in the apparatus of the present application.
Figure 2:
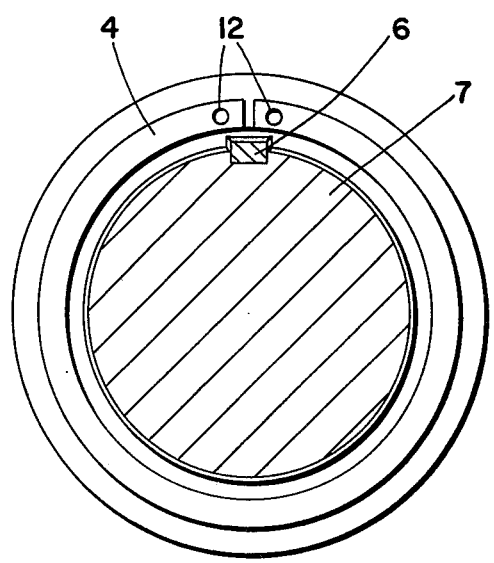
FIG. 2 is an end elevational view of the knife assembly shown in FIG. 1, and with the knife assembly being mounted on a shaft which is shown in section.

Referring now to the drawing, and particularly FIG. 1, a circular knife assembly includes a cylindrical hub 1 having an axial keyway 5 in the inner surface thereof. As shown in FIG. 2, the knife assembly is positioned on a rotatable shaft 7, with a key 6 received in the hub keyway 5 and in a longitudinal groove in the outer surface of the shaft 7. The key 6 mounts the hub 1 on the shaft 7 against rotation relative thereto, while providing axial movement of the hub 1 relative to the shaft 7.

A generally cylindrical collar 3 is centrally positioned on the hub 1. The collar 3 has an axially extending width which is substantially less than the axial width of the hub 1. The collar 3 has flat opposite spacer surfaces generally indicated at 8 in FIG. 1 extending radially outwardly from the hub 1 outer surface. A pair of flat circular knife rings 2 are positioned on the hub 1 against the collar spacer surfaces 8. Circumferential grooves 11 in the outer surface of the hub 1 closely adjacent the outer surfaces of the knife rings 2 receive radially split snap rings 4 which hold the knife rings 2 on the hub 1 against the collar spacer surfaces 8. As shown in FIG. 2, each split ring 4 has holes 12 adjacent the radial split therein for receiving the points of a needle nose tool for springing the ring open in a known manner.

The collar 3 has a flat outer cylindrical surface spaced substantially the same distance outwardly from the hub 1 as the circular cutting edges of the knife rings 2. As best shown in FIG. 1, the opposite flat faces of the collar 3 are stepped so that opposite flat secondary surfaces extend radially inwardly from the outer peripheral surface of the collar 3 in inwardly spaced relationship of the knife rings 2 and the spacer surfaces 8. These secondary collar surfaces intersect the spacer surfaces 8 at a shoulder located approximately midway between the outer surface of the hub 1 and the outer peripheral surface of the collar 3. This provides an axial space or clearance for deflection of the outer portions of the knife rings 2 axially. The knife rings 2 are formed of spring steel or the like so they are elastically yieldable axially of the hub 1. The flat snap rings 4 firmly engage against the flat knife rings 2 for holding same against the collar spacer surfaces 8.

Figure 3:
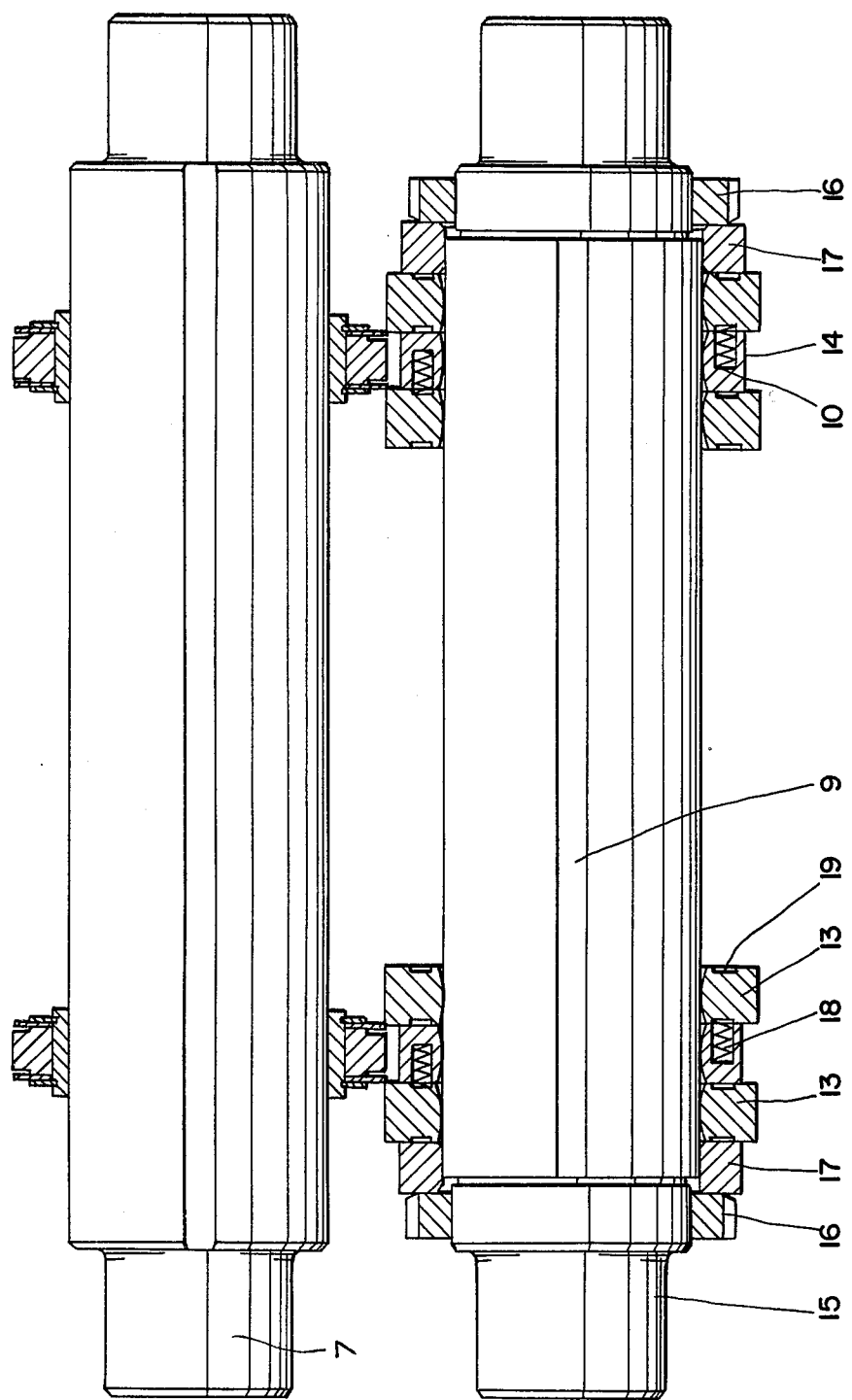
FIG. 3 is an elevational view showing a pair of rotatable shafts having knife assemblies of the present application mounted thereon, and with the knife assemblies being in section for clarity of illustration.

A plurality of the knife assemblies of FIG. 1 are mounted on the shaft 7 as indicated generally in FIG. 3. In the arrangement shown in FIG. 3, the shaft 7 is an upper shaft and the shaft 15 is a lower shaft. However, it will be recognized that the shafts 7 and 15 may have other relationships as long as they are rotatably mounted in spaced parallel relationship for passage of sheet material therebetween. The other knife assembly used in the cutting apparatus of the present application includes a pair of axially-spaced generally cylindrical knife members 13 having cylindrical outer peripheral surfaces which support the sheet material being slit while passing through the cooperating opposed knife assemblies. A spacer ring 14 is positioned between the knife members 13 and has an outer diameter substantially less than the diameter of the knife members 13. The spacer ring 14 determines the cutting gap between the opposite flat facing surfaces of the knife members 13.

The knife members 13 and the spacer ring 14 have suitable axial keyways in their inner surfaces for receiving an axial key 9 on the shaft 15 for preventing rotation of the knife members 13 and the spacer ring 14 relative to the shaft 15. The knife members 13 and the spacer ring 14 are clamped axially together by releasable clamping means in the form of screw rings 16 threaded on the shaft 15 adjacent the opposite end portions thereof and acting through intermediate bearing rings 17 to urge the knife members 13 and the spacer rings 14 axially into engagement with one another.

The knife members 13 and the spacer rings 14 have central mounting holes therethrough for closely receiving the shaft 15. Each central mounting hole increases in size from near the axial center thereof toward the opposite ends thereof as shown in FIG. 3. That is, the central mounting holes are generally conical as they proceed inwardly from the opposite flat outer faces of each knife member and spacer ring 14. This allows limited tilting movement in somewhat of a universal manner of the knife members 13 and the spacer ring 14 relative to the shaft 15 for accommodating irregularities and out of flatness in the axial faces of these members. This also allows the knife members 13 and the spacer ring 14 to be clamped axially against one another even though the central mounting hole therethrough may not be perfectly perpendicular to the flat end faces thereof.

Each spacer ring 14 has blind ended holes 10 extending axially from the opposite faces thereof and circumferentially-spaced therearound. Biasing means in the form of coil springs 18 are received in the blind holes 10. The outer ends of the springs 18 are received in a circular face groove 19 on the adjacent end face of a knife member 13. The springs 18 have a length such that they normally bias the knife members 13 and the spacer ring 14 away from one another, and are fully compressed when the releasable clamping means applies an axial force to move the knife members 13 and the spacer ring 14 into firm engagement with one another. When the axial clamping means defined by the screw rings 16 is released or loosened, the springs 18 provide axial separation of the knife members 13 to increase the gap between the facing surfaces thereof for allowing movement of the shafts 7 and 15 toward one another to position the knife rings 2 in the gap between the knife members 13. The releasable axial clamping means defined by the screw rings 16 is then tightened for urging the knife members 13 and the spacer rings 14 axially together. This elastically deforms the knife rings 2 slightly between each pair of knife members 13 so there is no cutting gap. This is because the axial spacing between the knife members is slightly greater than the distance between the facing surfaces of each pair of knife members 13 in their clamped condition. The axial spacing between the knife rings 2 is greater than the spacing between the facing surfaces of the knife members 13 by a few thousandths of a millimeter. This provides close cooperation between the outer flat surfaces of each knife ring 2 and the inner facing surfaces of the knife members 13.

It will be recognized that the knife assemblies on the lower shaft 15 can also be in the form of knife assemblies described with reference to FIG. 1.

The mounting means for the knife members 13 and the spacer ring 14 includes the axial key 9 and the releasable clamping means defined by the screw rings 16. The knife assemblies of FIG. 1 are mounted on the shaft 7 against rotation by the key 6 but are free to shift axially, and are maintained in proper position by reception of the knife rings 2 in the gaps between adjacent knife members 13.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications which fall within the true spirit and scope of the invention.

I claim:

1. Slitting apparatus comprising: a pair of spaced parallel shafts having cooperating knife means thereon, said knife means on one said shaft comprising a hub mounted on said one shaft for rotation therewith and for axial movement relative thereto, a pair of flat circular knife rings mounted on said hub in axially-spaced relationship to one another and being elastically yieldable axially of said shafts, said knife means on the other of said shafts including a pair of axially-spaced circular knife members mounted on said other shaft and having opposed substantially flat facing surfaces spaced-apart for close reception of said knife rings therebetween, releasable clamping means for mounting said knife members to said other shaft against axial movement relative thereto and being releasable for providing axial movement of said knife members relative to said other shaft and to one another for increasing the axial spacing between said facing surfaces of said knife members to place said knife rings therebetween, a spacer ring on said other shaft between said knife members, and springs interposed between said spacer ring and said knife members for moving said knife members axially away from one another upon release of said clamping means.

2. Slitting apparatus comprising: a pair of spaced parallel shafts having cooperating knife means thereon, said knife means on one said shaft comprising a hub mounted on said one shaft for rotation therewith and for axial movement relative thereto, a pair of flat circular knife rings mounted on said hub in axially-spaced relationship to one another and being elastically yieldable axially of said shafts, a collar on said hub between said knife rings, said collar having opposite flat collar spacer surfaces against which said knife rings are held, said flat collar spacer surfaces extending radially outwardly of said hub a distance substantially less than said knife rings, said knife means on the other of said shafts including a pair of axially-spaced circular knife members mounted on said other shaft and having opposed substantially flat facing surfaces spaced-apart for close reception of said knife rings therebetween.

3. The slitting apparatus of claim 2 wherein said knife rings have outer cutting edges and said collar has a collar outer surface, said cutting edges and said collar outer surface being spaced outwardly substantially the same distance from said hub, said collar spacer surfaces extending radially outwardly from said hub, and said collar having opposite flat collar secondary surfaces extending inwardly from said collar outer surfaces and being spaced axially inwardly from said knife rings.

4. The slitting apparatus of claim 3 wherein said hub has outer circumferential grooves therein outwardly of said knife rings, and split retaining rings received in said grooves for holding said knife rings on said hub against said collar spacer surfaces.

5. Slitting apparatus comprising: a pair of spaced parallel shafts having cooperating knife means thereon, said knife means on one said shaft comprising a hub mounted on said one shaft for rotation therewith and for axial movement relative thereto, a pair of flat circular knife rings mounted on said hub in axially-spaced relationship to one another and being elastically yieldable axially of said shafts, said knife means on the other of said shafts including a pair of axially-spaced circular knife members mounted on said other shaft and having opposed substantially flat facing surfaces spaced-apart for close reception of said knife rings therebetween, said knife members having central mounting holes therethrough for receiving said other shaft, and each said mounting hole increasing in size from the axial center of each said knife member toward the outer axial end surfaces thereof for providing limited tilting of said knife members relative to one another and to said other shaft.

6. Slitting apparatus comprising: a pair of spaced parallel shafts having cooperating knife means thereon, said knife means on one said shaft comprising a hub mounted on said one shaft for rotation therewith and for axial movement relative thereto, a pair of flat circular knife rings mounted on said hub in axially-spaced relationship to one another and being elastically yieldable axially of said shafts, said knife means on the other of said shafts including a pair of axially-spaced circular knife members mounted on said other shaft and having opposed substantially flat facing surfaces spaced-apart for close reception of said knife rings therebetween, a spacer ring interposed between the knife members on said other shaft, said spacer ring having a substantially smaller external diameter than said knife members, said spacer ring and said knife members having central mounting holes therethrough for receiving said other shaft, each said mounting hole increasing in size from the axial center thereof toward the opposite ends thereof for providing limited tilting movement of said spacer ring and knife members relative to said other shaft, releasable clamping means for releasably clamping said knife members against said spacer ring, and biasing means interposed between said spacer ring and said knife members for axially separating said spacer ring and knife members when said clamping means is released.

7. In a precision slitting apparatus including rotatable upper and lower parallel shafts respectively having cooperating upper and lower knife means thereon, said lower knife means being fixed against axial movement along said lower shaft and having flat end surfaces which overlap with said upper knife means for slitting strip material passing therebetween, the improvement comprising: said upper knife means including a hub movable axially along said upper shaft, a circular collar member positioned on said hub and having a width axially of said upper shaft which is substantially less than the width of said hub, said collar member having opposite substantially flat spacer surfaces, substantially flat knife rings positioned against said spacer surfaces and being yieldably deformable axially of said upper shaft, circumferential grooves in said hub outwardly of said knife rings, and snap rings received in said grooves for holding said knife rings against said spacer surfaces.

8. Slitting apparatus comprising: a pair of circular knife members, a spacer ring interposed between said knife members and having an external diameter substantially smaller than said knife members, central mounting holes through said spacer ring and knife members, a mounting shaft received through said mounting holes, each said mounting hole increasing in size from the axial center thereof toward the opposite ends thereof for providing limited tilting movement of said spacer ring and knife members relative to one another and to said shaft, and mounting means for mounting said spacer ring and knife members on said shaft against rotational and axial movement relative thereto.

9. The slitting apparatus of claim 8 wherein said mounting means includes releasable clamping means for releasably axially clamping said spacer ring and knife members against one another, and biasing means interposed between said spacer ring and knife members for axially separating said spacer ring and knife members upon release of said clamping means.

10. The slitting apparatus of claim 9 wherein said biasing means comprises a plurality of circumferentially-spaced coil springs, said spacer ring having a plurality of circumferentially-spaced blind ended bores therein receiving said springs, circular grooves in said knife members facing said spacer ring, and said springs having outer spring ends received in said grooves.

11. Slitting apparatus comprising: a hub, a collar mounted on said hub and having opposite collar spacer surfaces extending substantially radially outwardly from said hub, a pair of knife rings positioned on said hub, means for holding said knife rings on said hub against said spacer surfaces, said knife rings having cutting edges and said collar having a collar outer surface spaced outwardly from said hub substantially the same distance as said cutting edges, said collar having opposite flat collar secondary surfaces extending inwardly toward said hub from said collar outer surface, said collar secondary surfaces being spaced inwardly from said knife rings, and said knife rings being elastically yieldable toward said collar secondary surfaces.

12. The slitting apparatus of claim 11 wherein said means for holding said knife rings on said hub against said collar spacer surfaces includes circumferential grooves on said hub and split snap rings received in said grooves.

* * * * *